United States Patent [19]

Beard

[11] Patent Number: 5,780,992
[45] Date of Patent: Jul. 14, 1998

[54] RECHARGEABLE BATTERY SYSTEM ADAPTABLE TO A PLURALITY OF BATTERY TYPES

[75] Inventor: Paul Beard, Milpitas, Calif.

[73] Assignee: Norand Corporation, Cedar Rapids, Iowa

[21] Appl. No.: 695,838

[22] Filed: Aug. 9, 1996

Related U.S. Application Data

[60] Provisional application No. 60/002,679, Aug. 9, 1995.

[51] Int. Cl.[6] .......................... H01M 10/46; H01M 10/48
[52] U.S. Cl. .......................... 320/106; 320/DIG. 12
[58] Field of Search ......................... 320/2, 5, 15, 21, 320/29, 30, 32, 35, 39, 43, 48, 106, 132, DIG. 21, DIG. 12, 114; 429/98, 99, 100

[56] References Cited

U.S. PATENT DOCUMENTS

| | | |
|---|---|---|
| 4,052,656 | 10/1977 | Lavell et al. . |
| 4,388,582 | 6/1983 | Saar et al. . |
| 4,392,101 | 7/1983 | Saar et al. . |
| 4,583,034 | 4/1986 | Martin . |
| 4,670,703 | 6/1987 | Williams . |
| 4,679,000 | 7/1987 | Clark . |
| 4,709,202 | 11/1987 | Koenck et al. . |
| 4,885,523 | 12/1989 | Koenck . |
| 4,965,738 | 10/1990 | Bauer et al. . |
| 5,043,650 | 8/1991 | Bhagwat et al. . |
| 5,057,383 | 10/1991 | Sorika ........................ 429/98 X |
| 5,122,722 | 6/1992 | Goedken et al. . |
| 5,321,627 | 6/1994 | Reher . |
| 5,325,041 | 6/1994 | Briggs . |
| 5,341,082 | 8/1994 | Lorenzen et al. . |
| 5,396,163 | 3/1995 | Nor et al. . |
| 5,463,305 | 10/1995 | Koenck . |
| 5,485,073 | 1/1996 | Kasashima et al. ........... 320/15 |
| 5,508,599 | 4/1996 | Koenck ........................ 320/21 |
| 5,536,590 | 7/1996 | Cheiky ........................ 429/98 X |
| 5,541,489 | 7/1996 | Dunstan ........................ 320/2 |
| 5,557,188 | 9/1996 | Piercey ........................ 320/5 |
| 5,561,361 | 10/1996 | Sengupta et al. ........... 320/30 X |

*Primary Examiner*—Edward Tso
*Attorney, Agent, or Firm*—Suiter & Associates PC; Kenneth J. Cool

[57] ABSTRACT

An adaptive rechargeable battery system capable of utilizing battery packs of a variety of electrochemical cells includes a portable electronic battery powered device for operating from battery power, a rechargeable battery pack, and means for determining characteristic battery information and parameters of the rechargeable battery pack such that the portable electronic battery powered device may adapt to optimally utilize the rechargeable battery pack in accordance with the characteristic battery information and parameters. The adaptive rechargeable battery system includes a method for adaptively utilizing a rechargeable battery pack by reading the characteristic battery parameter data from electronic storage means contained within the battery pack or by determining the characteristic battery parameter data and subsequently configuring and operating the portable battery powered electronic device to optimally utilize the rechargeable battery pack according to the characteristic battery parameter data.

32 Claims, 3 Drawing Sheets

RECHARGEABLE BATTERY SYSTEM ADAPTABLE TO A PLURALITY OF BATTERY TYPES

CROSS REFERENCE TO RELATED APPLICATIONS

The present application claims the benefit under 35 USC § 119 of U.S. Provisional Application Ser. No. 60/002,679, filed Aug. 9, 1995. Said Provisional Application Ser. No. 60/002,679, is herein incorporated by reference in its entirety.

TECHNICAL FIELD

The present invention relates generally to battery charging systems and specifically to a battery charging system which is capable of adapting to a variety of battery packs in order to maximize the utilization thereof.

BACKGROUND OF THE INVENTION

Portable electronic devices have made great advances in increased power and utility. Applications of portable electronic devices such as portable data collection and processing terminals often require the operator to be mobile and roaming such that the portable electronic device must be powered by a reusable self-contained power supply which typically is some form of rechargeable battery pack. Rechargeable battery systems commonly employ various types of electrochemical cells each of which having certain inherent advantages and disadvantages. Typical portable electronic devices may utilize nickel-cadmium (NiCad) or sealed lead-acid (SLA) electrochemical cells for use in rechargeable battery systems, for example.

Demand for batteries with higher energy densities and lower costs is fueling the search for alternatives to traditional nickel-cadmium or lead-acid electrochemical cells. For example, nickel-metal-hydride (NiMH) electrochemical cells have greater energy densities than nickel-cadmium cells but are correspondingly more expensive. Zinc-air (Zn-air) cells also offer high energy densities but cannot be rapidly charged and have shorter operational life spans. Lithium (Li) and lithium ion (Li ion) cells are well suited to applications requiring extended periods of use and offer high energy densities.

No one battery technology has yet to emerge as the industry standard for utilization in state of the art portable electronic devices. As a result of the variety of rechargeable battery technologies available on the market for use in portable electronic devices and because of the differences in cost between the competing battery technologies, it is advantageous for portable electronic devices to be able to adaptively utilize any of the various available battery technologies while simultaneously maximizing the utilization of a given battery technology.

Consideration of the of the charging characteristics of the particular electrochemical cell to be utilized is necessary for maximizing the amount of energy the battery will hold and to prevent overcharging of the battery, for example. An incorrectly charged, improperly charged, overcharged or undercharged battery may lose the ability to store an electric charge, may produce a voltage less than the nominal voltage or may combust or explode, for example. Additionally, the number of charge cycles the battery is capable of undergoing may be significantly reduced causing premature battery failure which may require specialized reconditioning in order to return the battery to a proper operational state.

Improper battery charging may also lead to permanent premature battery failure. Thus, the battery charging process must account for the characteristic charging behavior of the particular electrochemical cells in order to ensure proper functioning and maximized output and lifespan of the battery to be utilized.

Electrochemical cells do not charge linearly over the duration of the charging process. Due to the chemical characteristics of the particular elemental combinations used for storing energy in the cell as chemical energy, an electrochemical cell passes through a series of states of varying electrical behavior as observed from the terminals of the cell. In general, electrochemical cells draw higher amounts of current when charging from a state of low potential energy than when charging from a higher state of potential energy when at or near a full capacity state of charge. The electrochemical cell exhibits variations in voltage at its terminals as well, correlating to the changing current draw as energy is delivered into the cell. Each type of electrochemical cell exhibits its own unique charging characteristics. The unique charging characteristics may be determined by observing the electrical terminal behavior of the cells over time while being charged or discharged.

Methods of charging and recharging batteries comprised of rechargeable electrochemical cells are well known in the art. Of the several varieties of rechargeable cells in common use, the particular type of cell to be utilized may depend upon, for example, the current draw requirements of the particular electronic device to be powered by the battery, the length of time the electronic device will be utilized between charges and the cost of the particular electrochemical cells. However all of the previous methods and circuits for charging rechargeable batteries known in the art have always relied on the assumption that the type of electrochemical cell utilized in the battery pack is known and predetermined. None of the previous methods and circuits for charging rechargeable batteries known in the art determine or are capable of determining the type of electrochemical cell utilized in a battery when the type of cell is unknown.

SUMMARY OF THE INVENTION

It is an object of the present invention to provide an adaptive rechargeable battery system which is capable of determining the type of electrochemical cell utilized in a given battery pack when the type of cell utilized therein is unknown.

Another object of the present invention is to provide an adaptive rechargeable battery system which is capable of determining the capacity of the battery pack when the capacity thereof is unknown.

It is another object of the present invention to provide an adaptive rechargeable battery system which is capable of determining the number of electrochemical cells utilized in a given battery pack when the number of cells utilized therein is unknown.

It is yet another object of the present invention to provide an adaptive rechargeable battery system which is capable of adapting to a particular charging algorithm for various types of battery packs comprising various types of electrochemical cells in order to maximize the utilization thereof.

It is yet a further object of the present invention to provide an adaptive rechargeable battery system which is capable of determining and tracking the number of recharge cycles which a particular battery pack undergoes.

BRIEF DESCRIPTION OF THE DRAWINGS

The numerous objects and advantages of the present invention may be better understood by those skilled in the art by reference to the accompanying figures in which.

DETAILED DESCRIPTION OF AN EXEMPLARY EMBODIMENT

Figure 1:
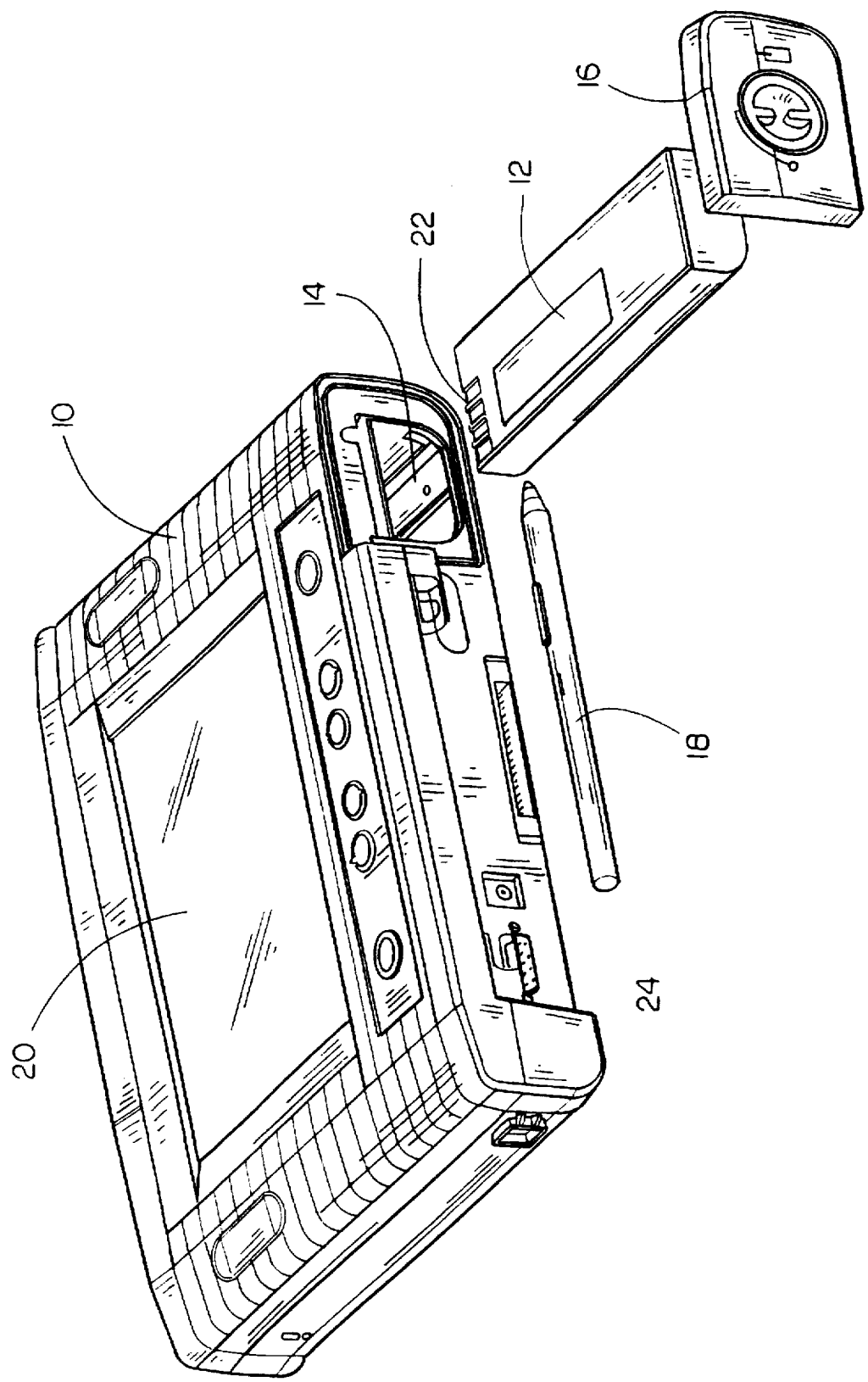
FIG. 1 an isometric view of a portable electronic data terminal in which the present invention may be utilized further showing a battery pack, battery endcap and input stylus.

FIG. 1 illustrates a typical portable data collection terminal which exemplifies the type of portable electronic equipment which may utilize the adaptive rechargeable battery system of the present invention. The portable data collection terminal 10 may be the type utilized for information and data gathering, processing, utilizing and transmitting. The portable data terminal 10 preferably utilities a rechargeable battery 12 which consists of multiple electrochemical cells. The portable data terminal 10 preferably utilizes the rechargeable battery pack 12 as the main source of operational power to allow for the operator of the data terminal 10 to be mobile and roaming in order to facilitate the data gathering and collection process.

The rechargeable battery pack 12 is preferably removably instertible into a battery cavity 14 existing in the portable data terminal 10. The battery pack 12 may be removably secured within the battery cavity 14 with a battery endcap 16 or other means for securing the battery, for example. The battery endcap 16 may conform to the overall shape and design of the exterior of the portable data terminal 10 and thereby contiguously integrate with the exterior structure of the data terminal 10. The operator of the data terminal 10 may insert or remove the battery pack 12 into or from the data terminal 10 when replacing the battery pack 12.

The portable data terminal 10 of FIG. 1 may utilize an input stylus 18 in lieu of a data input keypad, for example. The input stylus 18 of portable data terminal 10 preferably utilizes an active stylus system, however a passive input stylus system may be utilized as well. Data input functions may be performed by contact of the data input stylus 18 onto the display screen 20 of the data terminal 10 wherein the display screen 20 is adapted to receive touch screen or stylus type data input.

The portable data terminal 10 preferably includes an external power receptacle 24, or jack, in order to receive an alternate source of external operational power (not shown). The alternate source of operational power is preferably a voltage limited and current limited source of dc power adapted to the power utilization requirements of the data terminal 10. The external power receptacle 24 may utilize the external power source to operate the data terminal 10 when the battery pack 12 is removed from the battery cavity 14 and in lieu thereof. Alternatively, when the battery pack 12 is present within the battery cavity 14, the external power source may be utilized to charge the battery pack 12 from a low state of battery charge or to provide a topping charge to the battery pack 12, for example. Additionally, the external power source may provide supplemental operational power to the data terminal when the energy of the battery pack 12 is low, for example.

The external power source preferably simultaneously provides dc power to the portable data terminal 10 and to the battery pack 12 via a plurality of electrical contacts 22 on the exterior of the battery pack. The electrical contacts 22 of the battery pack 12 preferably provide power and data path contacts between the data terminal 10 and the battery pack 12.

Figure 2:
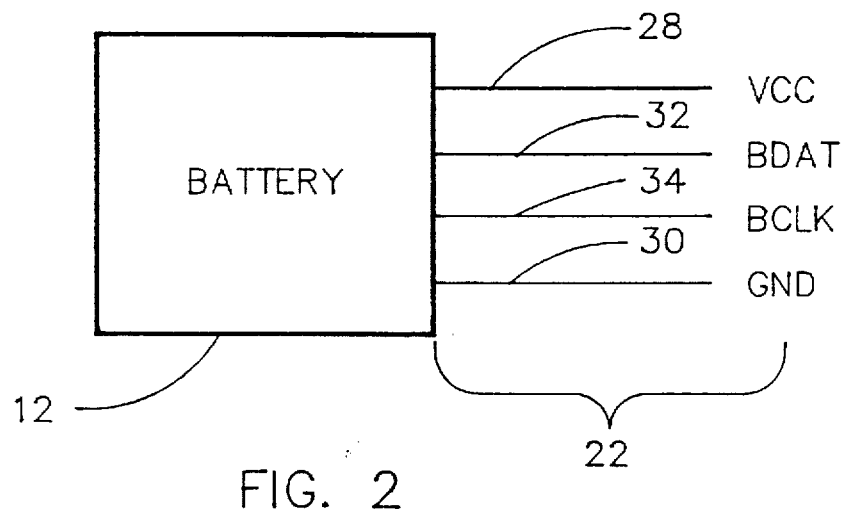
FIG. 2 is a conceptual diagram of a preferred battery pack which may be utilized with the present invention.

FIG. 2 illustrates a typical battery pack 12 which may be utilized with the present invention. The battery pack 12 may include a plurality of contact paths 22 for the transfer of data and power signals into and out of the battery pack 12. Various types of battery packs may or may not include all of the contact paths 22 as shown in FIG. 2; however, all battery packs must include at least a positive power supply contact path (VCC) 28 and a negative power supply or ground contact path (GND) 30. The positive power supply contact path 28 and the ground contact path 30 provide means for transferring direct current power into or out of the battery pack 12.

Additionally, battery pack 12 preferably, but not necessarily, includes internal electronic circuitry for providing and performing various battery operational data control and charging functions. For example, battery pack 12 may preferably include programmable microprocessor circuitry for sensing, processing and storing battery parameter information therein. Battery data may be stored within the battery pack 12 with means for storing electronic data. The battery pack 12 may, for example, provide battery parameter information to the microprocessor of the portable data terminal 10 via a battery data contact path (BDAT) 32. Further, the programmable microprocessor circuitry included in the battery pack 12 may receive a timing control clock signal (BCLK) 34 from an internal clock of the portable data terminal 10. It should be noted that the inclusion of programmable microprocessor circuitry in the battery pack is not essential to the operation of the present invention.

Figure 3:
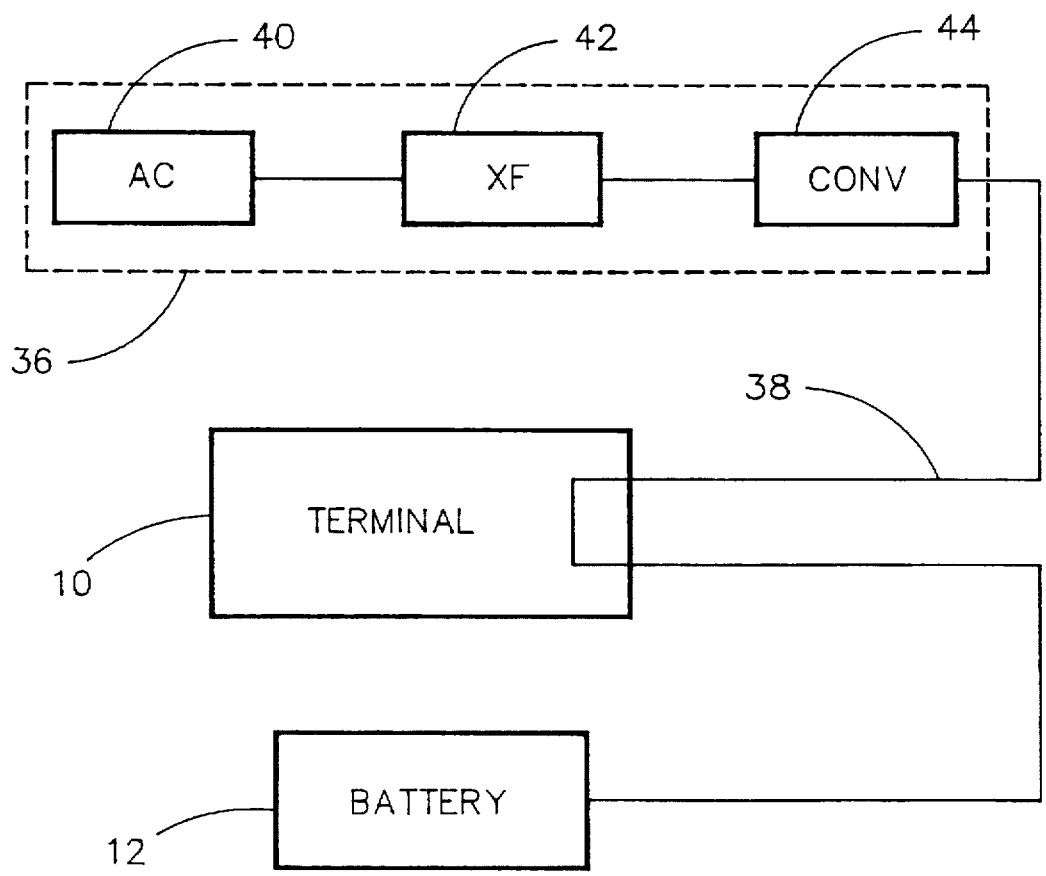
FIG. 3 is a schematic block diagram of an exemplary embodiment of the present invention showing the interrelation between a portable data terminal, a power supply and a battery pack.

FIG. 3 is a block diagram illustrating the battery charging control relationship between a portable data terminal, an external power source, and a battery pack in a preferred embodiment of the present invention. An external power source 36 preferably provides a dc signal to data terminal 10 and battery pack 12 via power supply path 38. The external power source preferably includes power input from an ac voltage source (AC) 40, typically a 120 V, 60 Hz source. The ac voltage is preferably stepped down to a nominal voltage level on the order of the operational voltage of the data terminal 10 typical using a step down transformer (XF) 42. Further conditioning of the stepped down voltage may be included with the transformer circuitry 42 for rectification of the ac signal into a direct current signal and for further filtering and removal of spurious ripple components thereof, for example.

A dc-to-dc convertor-regulator (CONV) 44 may be utilized to provide the portable data terminal 10 with a well regulated, constant voltage, constant current dc output power signal. The constant current, constant voltage dc output power signal is provided to the battery 12 via continuously passing the output power signal path 38 to the battery pack 12 through the data terminal 10. In this configuration the external power supply 36 may perform charging functions upon the battery pack 12 while the battery pack 12 remains in the data terminal 10 without requiring removal of the battery pack 12 from the battery cavity 14 shown in FIG. 1.

The portable data terminal 10 is preferably capable of utilizing a variety of battery packs 12 each of which utilizing a particular type of electrochemical cell. When a new battery pack 12 is inserted into the battery cavity 14 of the data terminal 10 shown in FIG. 1, the data terminal 10 preferably queries the battery pack 12 for information. Referring to Appendix A and the elements of the invention depicted in FIG. 1, the battery query may preferably follow the pseudocode routine set forth in Appendix A.

The data terminal 10 may determine that a new battery pack 12 has been inserted into the battery cavity 14 of the data terminal 10. If the battery pack 12 is of the sort containing battery data therein, the battery information routine branches to read the information stored within electronic memory storage means contained within the battery pack 12. Information stored within the electronic memory storage means of the battery pack preferably includes a battery identification number, the type of electrochemical cells which the battery pack 12 comprises, the number of electrochemical cells utilized in the battery pack 12, the nominal output voltage of the battery pack 12, the total capacity of the battery pack 12, the present battery capacity if available, and the number of charge/discharge cycles that have been performed on the battery pack 12, for example. The a quick measure of the present output voltage of the battery may be determined as well. The retrieved information of the battery pack 12 may be displayed for utilization thereof by the user on the display screen 20 of the data terminal 10.

If the battery pack 12 is of the sort that does not contain battery data, or if the battery pack is of the sort that contains battery data but for some reason the data is not available to the data terminal (e.g. destroyed or corrupted), then the battery information routine as described in Appendix A branches to determine the battery information. Information may be displayed to the user on the display screen 20 that no information on this particular battery is available and that a routine is being performed to determine the battery information. A battery information subroutine as preferably described in Appendix B may then performed. The battery information subroutine of Appendix B is preferably utilized to determine information on the particular battery pack 12 when the battery pack data is unknown.

The battery information subroutine of Appendix B preferably reports to the data terminal 10 the information determined to be displayed on display screen 20 to the user. The battery information subroutine preferably determines the type electrochemical cells utilized in the battery pack 12, determines the number of electrochemical cells in the battery pack 12, determines the nominal voltage of the battery pack 12, determines the present voltage of the battery pack 12, and determines the total capacity of the battery pack 12, for example.

Referring now to Appendix B showing in pseudocode a preferred subroutine for gathering battery information when the information is unknown, the present output voltage of the battery pack 12 is measured. The present output voltage of the battery pack 12 is preferably determined by input of the battery voltage signal 28 into an analog-to-digital (A/D) convertor which may produce a digital signal in response to the varying input levels received by the A/D convertor and readable by a microprocessor on the data terminal 10. If the battery voltage is greater than a first predetermined level, then the battery voltage is good and the battery pack may be utilized without recharging. Information on the battery pack 12 may be determined when the battery is charged by examining the characteristic behavior of the battery pack during the initial charging cycle.

If the output voltage of the battery pack 12 is less than the first predetermined level, then the battery voltage is too low to power the data terminal 10. The battery pack 12 must be charged, and battery information may then be determined during the charging process. The charging current may be set for charging according to the present battery voltage to determine the charging rate. The nominal output voltage of the battery pack 12 is preferably determined by measuring the battery output voltage 28 with the A/D convertor when battery pack 12 has reached full voltage after being completely charged.

The capacity of a cell or battery is the amount of electrical charge which the cell or battery is capable of storing, and is given in unit of current-time, typically ampere-hours. The mathematical relationship between capacity, current and time may be described as follows:

$$C = \int i(t)dt$$

Thus, the capacity of a cell or battery is the integral of the amount of current the cell or battery charges or discharges over the charging or discharging period. The capacity of the battery pack 12 is preferably determined by integrating the charging current of the battery pack over the given charging time. When the battery pack 12 is preferably charged with a constant current, the capacity of the battery pack 12 may be determined by the current-time product of the charging cycle. The capacity of the battery pack may be alternatively determined by numerical integration of the charging current over time when the battery pack 12 is not charged with a constant current.

The output voltage of the battery pack 12 is preferably monitored during the charging process in order to determine the type of electrochemical cell utilized in the battery pack 12. The voltage values and the voltage slope values at given points in time over the duration of the charging process are preferably monitored in order to determine the type of electrochemical cells by comparison of the variation in the voltage and voltage slope values over time with the characteristics of known types of electrochemical cells.

The slope of the charging profile of the battery pack 12 at any given point in time may be determined, for example, by dividing the resulting change in voltage by the corresponding change in time. Other numerical methods may also be utilized to analyze the charging profile of the battery pack. The resulting slope values and the actual voltage values at given points in time may be compared and matched with stored values for known types of electrochemical cells in order to match the present battery pack 12 to a known type of battery technology. Best fit analysis routines may be utilized in order to determine the best match to the type of electrochemical cells utilized, for example.

Figure 4A:
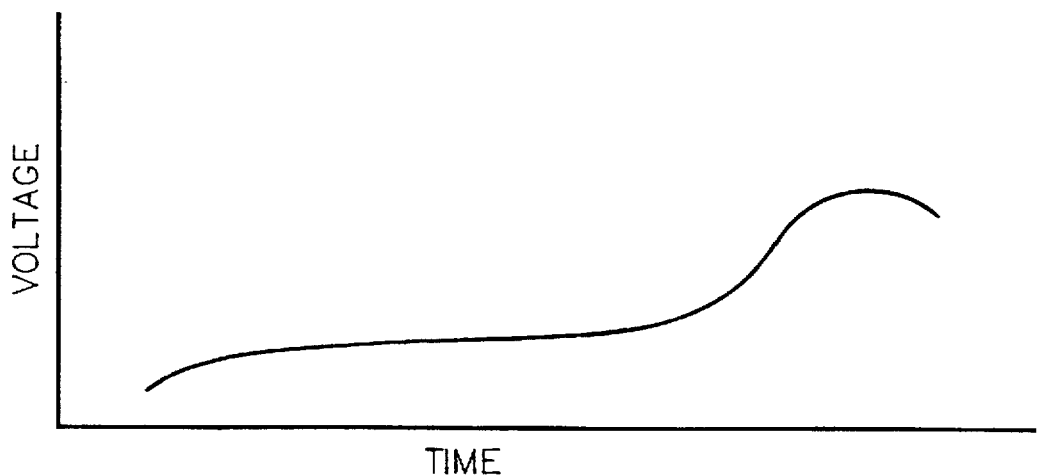
FIGS. 4A-4C is an illustration of the charging profiles of some commonly utilized types of electrochemical cells.
Figure 4B:
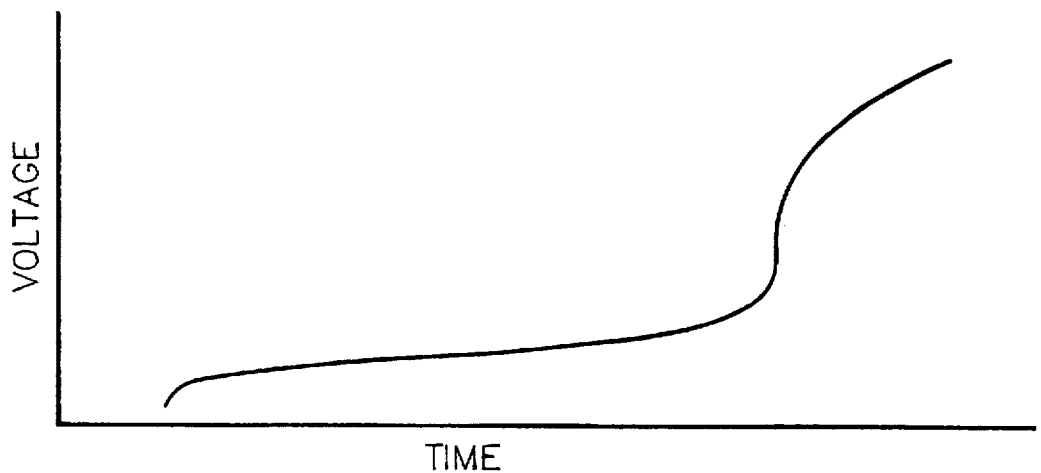
Figure 4C:
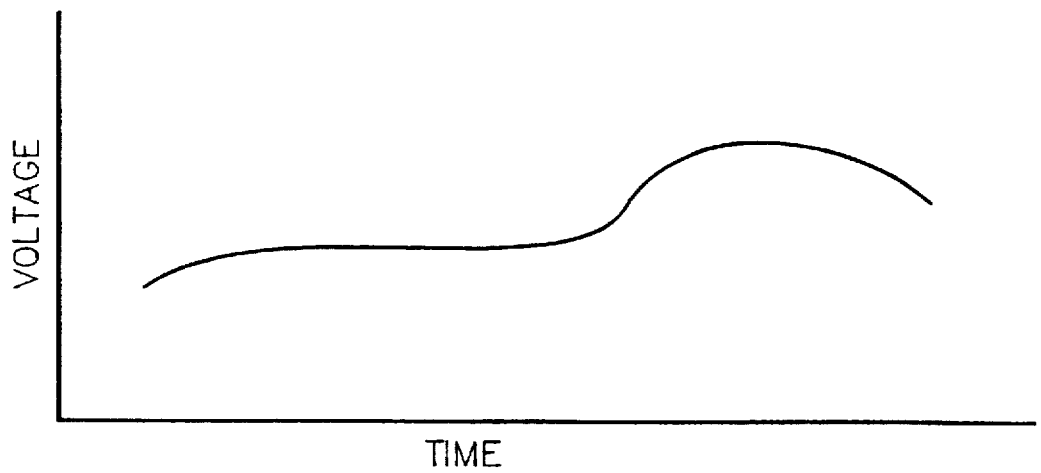

FIG. 4 illustrates the charging voltage profiles of some commonly utilized types of electrochemical cells. The type of electrochemical cell utilized in the present battery pack 12 may be determined, for example, by a comparison of the charging voltage profile of the present battery pack 12 with stored values of known electrochemical cell profiles. Well known numerical methods may be utilized to perform the comparison of the profile of the present battery pack 12 known profiles of electrochemical cells. For example, FIG. 4A depicts the charging profile for a lithium ion type electrochemical cell. FIG. 4B depicts the charging profile for a lead acid type electrochemical cell. FIG. 4C depicts the charging profile for a nickel-cadmium type electrochemical cell. FIGS. 4A, 4B, and 4C illustrate by way of example, and not by way of limitation, the charging profile of commonly utilized electrochemical cells. The profiles of other types of electrochemical cells, for example nickel-metal-hydride or zinc-air, may also be utilized and stored for profile comparison as well.

Referring back now to Appendix A, after the battery information subroutine of Appendix B performed, the determined information of the present battery pack 12 may be displayed to the user. The cell type is preferably determined from the methods of the battery information subroutine of Appendix B. The nominal voltage and the number of cells of the battery pack 12 may be derived by examination of the fully charged battery output voltage, the fully charged battery capacity, and known information about the nominal voltage and capacity per cell for a given electrochemical cell.

The number of cells in the battery pack 12 may be determined by dividing the nominal output voltage of the battery pack 12 by the known per cell nominal output voltage values for a given type of electrochemical cell. Alternatively, the number of cells may be determined by dividing the total capacity of the battery pack 12 by the known per cell capacities for a given type of electrochemical cell. Further, both per cell voltage and per cell capacity may be utilized in combination to determine the number of cells in the battery pack 12. For example, the battery information subroutine of Appendix B may determine that the present battery pack 12 utilizes lithium ion cells and that the battery pack 12 was charged to a voltage of 8.4 volts and to a capacity of 1200 milliamp-hours. Knowing that lithium ion cells produce a maximum of approximately 4.2 volts per cell and that each cell may have a capacity of 600 mA-hrs, it may be readily determined that the battery pack 12 utilizes two electrochemical cells. Knowledge of the number of cells utilized in a given battery pack may be utilized in monitoring and preventing overdischarging of the battery pack 12, or in determining when an individual cell, and thus the battery pack, has failed, for example.

The rechargeable battery system of the present invention may adapt to utilize a particular battery charging algorithm which is optimized for the particular electrochemical cell technology utilized in the battery pack 12 after the battery information is determined. For example, after the battery information algorithm of Appendix A determines that the present battery pack 12 utilizes lithium ion cells, the adaptive rechargeable battery system of the present invention may utilize a battery charging algorithm which is optimized for lithium ion batteries. The battery charging algorithm utilized for charging lithium cells preferably utilizes the process and apparatus for charging lithium cells or the like of U.S. application Ser. No. 08/328,250, filed Oct. 24, 1994 and assigned to the assignee of the present application. If, for example, the subsequent battery pack 12 inserted in the data terminal 10 utilizes nickel-cadmium cells, the battery system of the present invention may utilize a battery charging algorithm which is optimized for nickel-cadmium batteries.

The number of charge cycles for a particular battery pack 12 may be tracked so that it may be determined when the battery pack 12 is approaching or has reached the end of its useful life. The battery pack 12 preferably contains on-board electronic storage means such that the number of charge cycles the battery pack has undergone may be stored therein. If the battery pack 12 does not contain on-board electronic storage means, the number of charge cycles may still be tracked and stored in electronic storage means contained within the portable electronic device 10. In either case the display may indicate to the user, for example, that the battery pack has undergone a certain number of recharge cycles which, for that particular type of electrochemical cell, is typically the maximum number of recharge cycles for the battery back, thereby warning the user that the battery pack may soon need to be replaced.

APPENDIX A

BATTERY INFORMATION ROUTINE PSEUDOCODE

```
START
IS BATTERY DATA AVAILABLE?
    IF YES THEN
        DISPLAY
            "READING BATTERY DATA"
        READ
            BATTERY IDENTIFICATION NUMBER
            CELL TYPE
            NUMBER OF CELLS
            NOMINAL VOLTAGE
            BATTERY CAPACITY
            NUMBER OF CYCLES
            PRESENT BATTERY CAPACITY
        MEASURE
            BATTERY VOLTAGE
        DISPLAY
            BATTERY ID NUMBER
            CELL TYPE
            NUMBER OF CELLS
            VOLTAGE/CELL
            NOMINAL VOLTAGE
            PRESENT VOLTAGE
            CYCLES
            TOTAL CYCLES
            PRESENT CAPACITY
            TOTAL CAPACITY
    ELSE
        DISPLAY
            "NO DATA AVAILABLE"
            "--DETERMINING--"
        DO
            BATTERY INFORMATION SUBROUTINE
        DISPLAY
            CELL TYPE
            NUMBER OF CELLS
            NOMINAL VOLTAGE
            PRESENT VOLTAGE
            TOTAL CAPACITY
    ENDIF
END
```

APPENDIX B

BAUERY INFORMATION SUBROUTINE PSEUDOCODE

```
START
MEASURE BATTERY VOLTAGE
    IF BATTERY VOLTAGE GREATER THAN X VOLTS THEN
        DISPLAY
            "BATTERY VOLTAGE GOOD"
    ELSE
        DISPLAY
```

APPENDIX B-continued

BAUERY INFORMATION SUBROUTINE PSEUDOCODE

```
            "BATTERY VOLTAGE LOW"
            "CHARGING BATTERY"
      CHARGE BATTERY
            SET CHARGE CURRENT
            CAPACITY(NEW) = CAPACITY(OLD) + CURRENT * TIME
            MEASURE BATTERY VOLTAGE
            SLOPE = (VOLTAGE(NEW) - VOLTAGE(OLD))/DTIME
            COMPARE SLOPE WITH BATTERY DATABASE
            MATCH SLOPE VALUES TO DATABASE
      ENDIF
END
```

In view of the above detailed description of a preferred embodiment and modifications thereof, various other modifications will now become apparent to those skilled in the art. The contemplation of the invention below encompasses the disclosed embodiments and all reasonable modifications and variations without departing from the spirit and scope of the invention.

What is claimed is:

1. In a portable electronic battery powered system, an adaptive rechargeable battery system capable of utilizing battery packs of a variety of electrochemical cells, said adaptive rechargeable battery system comprising:
   (a) a portable electronic battery powered device for operating from battery power during portable operation thereof, said portable electronic device having a battery cavity for removably receiving a rechargeable battery pack;
   (b) a rechargeable battery pack removably insertible into the battery cavity of said portable electronic device, said rechargeable battery pack comprising a plurality of electrochemical cells and having a plurality of contact paths for the transfer of data and power signals into and out of said rechargeable battery pack for providing operational power to said portable electronic device during portable operation thereof and for electronic communications between said rechargeable battery pack and said portable electronic battery powered device; and
   (c) adaptive battery information determining means for determining characteristic battery information and parameters of said rechargeable battery pack including means for determining the composition of said electrochemical cells such that said portable electronic battery powered device may adapt to optimally utilize said rechargeable battery pack in accordance with the characteristic battery information and parameters thereof.

2. The adaptive rechargeable battery system of claim 1 wherein said portable electronic device includes a display screen, said display screen adapted to receive touch screen or stylus type data input.

3. The adaptive rechargeable battery system of claim 1 wherein said portable electronic device includes an external power receptacle for receiving and alternate source of external power wherein the alternate source of external power may be utilized to charge said rechargeable battery pack and to provide supplemental operational power to said portable electronic device.

4. The adaptive rechargeable battery system of claim 1 wherein said rechargeable battery pack includes internal electronic circuitry for providing and for performing battery operational data control and charging functions.

5. The adaptive rechargeable battery system of claim 1 wherein said rechargeable battery pack includes programmable microprocessor circuitry for sensing, for processing and for storing battery parameter data and information therein.

6. The adaptive rechargeable battery system of claim 1 wherein said rechargeable battery pack includes means for storing electronic data wherein the data includes battery parameter data and information.

7. The adaptive rechargeable battery system of claim 1 wherein said portable electronic device is capable of utilizing multiple types of rechargeable battery packs, each of said rechargeable battery packs comprising a particular type of various available types of electrochemical cells.

8. In a portable electronic battery system, a method for adaptively utilizing a rechargeable battery pack comprising:
   (a) inserting a rechargeable battery to be adaptively utilized into the battery cavity of a portable battery powered electronic device;
   (b) reading the characteristic battery parameter data and information including the electrochemical cell composition of the battery from electronic storage means contained within the rechargeable battery pack when the characteristic battery parameter data and information is stored therein;
   (c) determining the characteristic battery parameter data and information including the electrochemical cell composition of the battery with battery information determining means when the characteristic battery parameter data and information is not stored therein or when the characteristic battery parameter data and information is unreadable; and
   (d) configuring and operating the portable battery powered electronic device to optimally utilize the rechargeable battery pack according to the characteristic battery parameter data and information thereof.

9. The method for adaptively utilizing a rechargeable battery pack of claim 8 wherein said reading step includes reading the identification number of the rechargeable battery pack.

10. The method for adaptively utilizing a rechargeable battery pack of claim 8 wherein said reading step includes the step of reading the type of electrochemical cells which the rechargeable battery pack comprises.

11. The method for adaptively utilizing a rechargeable battery pack of claim 8 wherein said reading step includes the step of reading the number of electrochemical cells utilized in the rechargeable battery pack.

12. The method for adaptively utilizing a rechargeable battery pack of claim 8 wherein said reading step includes step of reading the nominal output voltage of the rechargeable battery pack.

13. The method for adaptively utilizing a rechargeable battery pack of claim 8 wherein said reading step includes the step of reading the total capacity of the rechargeable battery pack.

14. The method for adaptively utilizing a rechargeable battery pack of claim 8 wherein said reading step includes the step of reading the present capacity of the rechargeable battery pack.

15. The method for adaptively utilizing a rechargeable battery pack of claim 8 wherein said reading step includes the step of reading the number of charge/discharge cycles that the rechargeable battery pack has undergone.

16. The method for adaptively utilizing a rechargeable battery pack of claim 8 wherein said determining step includes the step of indicating to the operator of the portable electronic battery powered device that no battery information is available and that the adaptive rechargeable battery system is determining the battery parameter information.

17. The method for adaptively utilizing a rechargeable battery pack of claim 8 wherein said determining step includes the step of determining the type of electrochemical cells utilized in the rechargeable battery pack.

18. The method for adaptively utilizing a rechargeable battery pack of claim 8 wherein said determining step includes the step of determining the number of electrochemical cells utilized in the rechargeable battery pack.

19. The method for adaptively utilizing a rechargeable battery pack of claim 8 wherein said determining step includes the step of determining the nominal output voltage of the rechargeable battery pack.

20. The method for adaptively utilizing a rechargeable battery pack of claim 8 wherein said determining step includes the step of determining the present output voltage of the rechargeable battery pack.

21. The method for adaptively utilizing a rechargeable battery pack of claim 8 wherein said determining step includes the step of determining the total capacity of the rechargeable battery pack.

22. The method for adaptively utilizing a rechargeable battery pack of claim 17 wherein said determining step further includes the steps of monitoring the battery charging profile voltage over the duration of the charging process, comparing the battery charging profile voltage to the charging profile voltages of known types of electrochemical cells, and matching the battery charging profile to a known type of electrochemical cell.

23. The method for adaptively utilizing a rechargeable battery pack of claim 17 wherein said determining step further includes the steps of monitoring the battery charging profile voltage slope over the duration of the charging process, comparing the battery charging profile voltage slope to the charging profile voltage slopes of known types of electrochemical cells, and matching the battery charging profile to a known type of electrochemical cell.

24. The method for adaptively utilizing a rechargeable battery pack of claim 18 wherein said determining step further includes the step of comparing the nominal output voltage of the battery pack to known per cell output voltage values.

25. The method for adaptively utilizing a rechargeable battery pack of claim 18 wherein said determining step further includes the step of comparing the total capacity of the battery pack to known per cell capacity values.

26. The method for adaptively utilizing a rechargeable battery pack of claim 19 wherein said determining step further includes the step of converting the output voltage of the rechargeable battery pack into a microprocessor readable digital signal using an analog-to-digital convertor when the battery pack is charged to full capacity.

27. The method for adaptively utilizing a rechargeable battery pack of claim 20 wherein said determining step further includes the step of presently converting the output voltage of the rechargeable battery pack into a microprocessor readable digital signal using an analog-to-digital convertor.

28. The method for adaptively utilizing a rechargeable battery pack of claim 21 wherein said determining step further includes the steps of charging the battery pack over a predetermined charging period and integrating the charging current with respect to time to thereby determine battery capacity.

29. The method for adaptively utilizing a rechargeable battery pack of claim 21 wherein said determining step further includes the steps charging the battery pack with a constant current over a predetermined charging period and multiplying the charging current with the charging period to thereby determine battery capacity.

30. The method for adaptively utilizing a rechargeable battery pack of claim 21 wherein said determining step further includes the steps of charging the battery pack over a predetermined charging period and numerically integrating the charging current with respect to time to thereby determine battery capacity.

31. The method for adaptively utilizing a rechargeable battery pack of claim 8 wherein said configuring and operating step includes the step of utilizing a battery charging algorithm optimized for the particular electrochemical cell technology utilized in the rechargeable battery pack.

32. The method for adaptively utilizing a rechargeable battery pack of claim 8 wherein said configuring and operating step includes the step of tracking the number of charge cycles to which the rechargeable battery pack has been subjected.

* * * * *